United States Patent
Grimm

(10) Patent No.: US 9,423,075 B2
(45) Date of Patent: Aug. 23, 2016

(54) DEVICE FOR MONITORING THE STATE OF A SYSTEM

(71) Applicant: Euchner GmbH + Co. KG, Leinfelden-Echterdingen (DE)

(72) Inventor: Ilo Grimm, Waldenbuch (DE)

(73) Assignee: EUCHNER GMBH + CO. KG, Leinfelden-Echterdingen (DE)

( * ) Notice: Subject to any disclaimer, the term of this patent is extended or adjusted under 35 U.S.C. 154(b) by 89 days.

(21) Appl. No.: 13/261,915

(22) PCT Filed: Feb. 7, 2013

(86) PCT No.: PCT/EP2013/000368
§ 371 (c)(1),
(2) Date: Jun. 5, 2014

(87) PCT Pub. No.: WO2013/117336
PCT Pub. Date: Aug. 15, 2013

(65) Prior Publication Data
US 2014/0347190 A1    Nov. 27, 2014

(30) Foreign Application Priority Data
Feb. 11, 2012   (DE) .................. 10 2012 002 767

(51) Int. Cl.
*G08B 5/00*   (2006.01)
*F16P 3/08*   (2006.01)
*G08B 5/36*   (2006.01)

(52) U.S. Cl.
CPC .... F16P 3/08 (2013.01); G08B 5/36 (2013.01)

(58) Field of Classification Search
CPC ..................................... F16P 3/08; G08B 5/36
USPC .......... 340/815.4, 815.49, 815.5, 542, 545.1, 340/545.7, 555, 556, 557, 619, 4.36; 362/600
See application file for complete search history.

(56) References Cited

U.S. PATENT DOCUMENTS

2002/0142831 A1   10/2002   Mattice

FOREIGN PATENT DOCUMENTS

| DE | 692 01 486 T2 | 7/1995 | |
|---|---|---|---|
| DE | 196 49 593 A1 | 6/1998 | |
| DE | 19649593 A1 * | 6/1998 | ............. E05B 49/00 |
| DE | 203 13 230 U1 | 10/2003 | |
| EP | 0 990 835 A1 | 4/2000 | |
| FR | 2 684 167 | 5/1993 | |
| GB | 2 158 911 A | 11/1985 | |
| JP | 2004156312 | 6/2004 | |
| WO | WO 2007/051236 A1 | 5/2007 | |

* cited by examiner

*Primary Examiner* — Toan N Pham
(74) *Attorney, Agent, or Firm* — Wenderoth, Lind & Ponack, L.L.P.

(57) ABSTRACT

A device (1) monitors the state of a system (2), in particular safety switches for monitoring the closed state of safety equipment (2) of a machine (3). The device (1) is provided with a switch head (10) and an actuator (8), which can be brought into interaction with one another to control the device (1). The switch head (10) has an optical signaler (14) for optically signaling an operational state of the actuator (8) provided with a light-guide (28) having at least one entrance window (32) and at least one exit window (34, 36). In a state of the device (1) in which the switch bead (10) and the actuator (8) are interacting with one another, the light emitted by the signaler (14) enters, at least in part, via the at least one entrance window (32) and exits via the at least one exit window (34, 36).

15 Claims, 4 Drawing Sheets

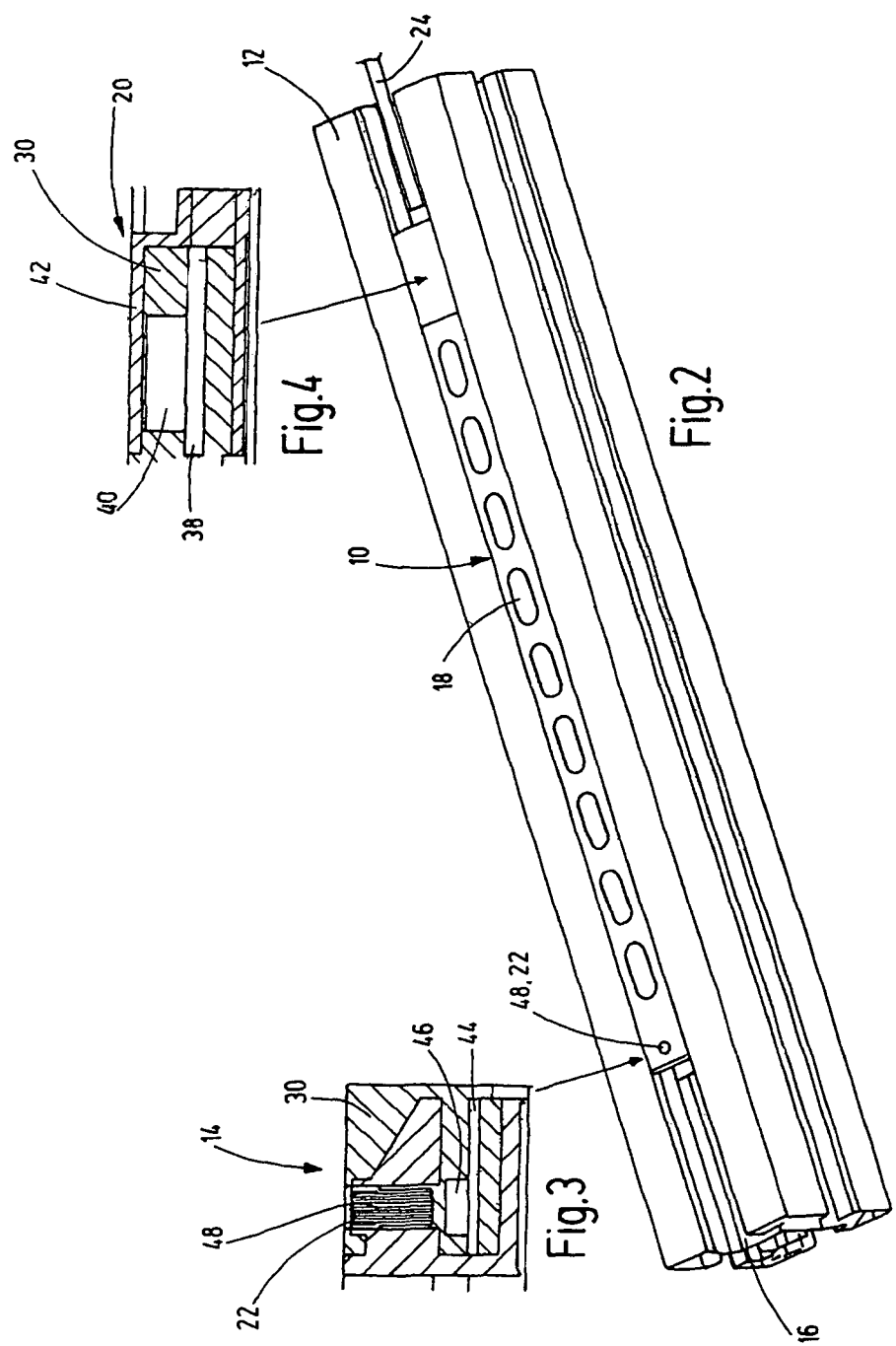

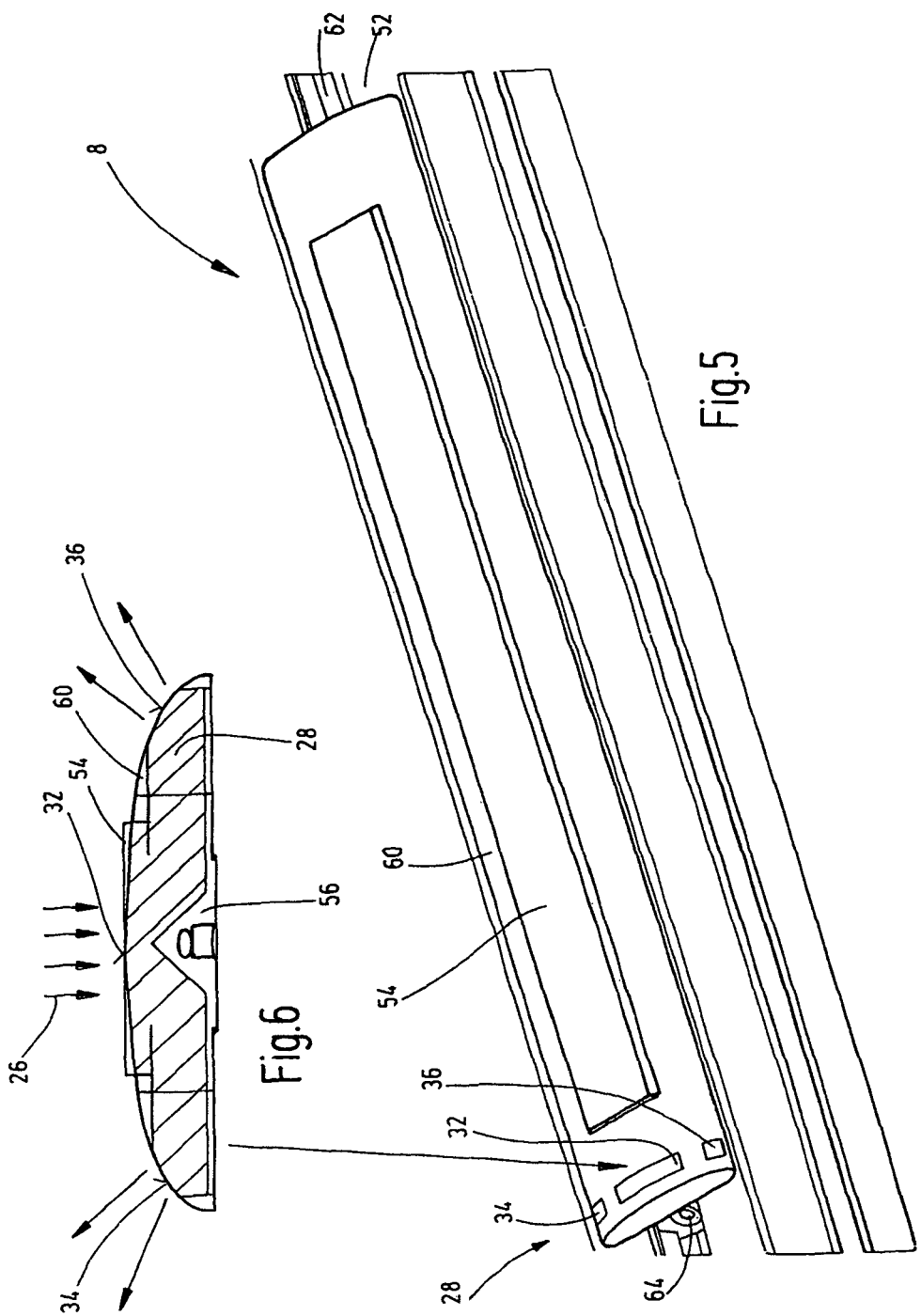

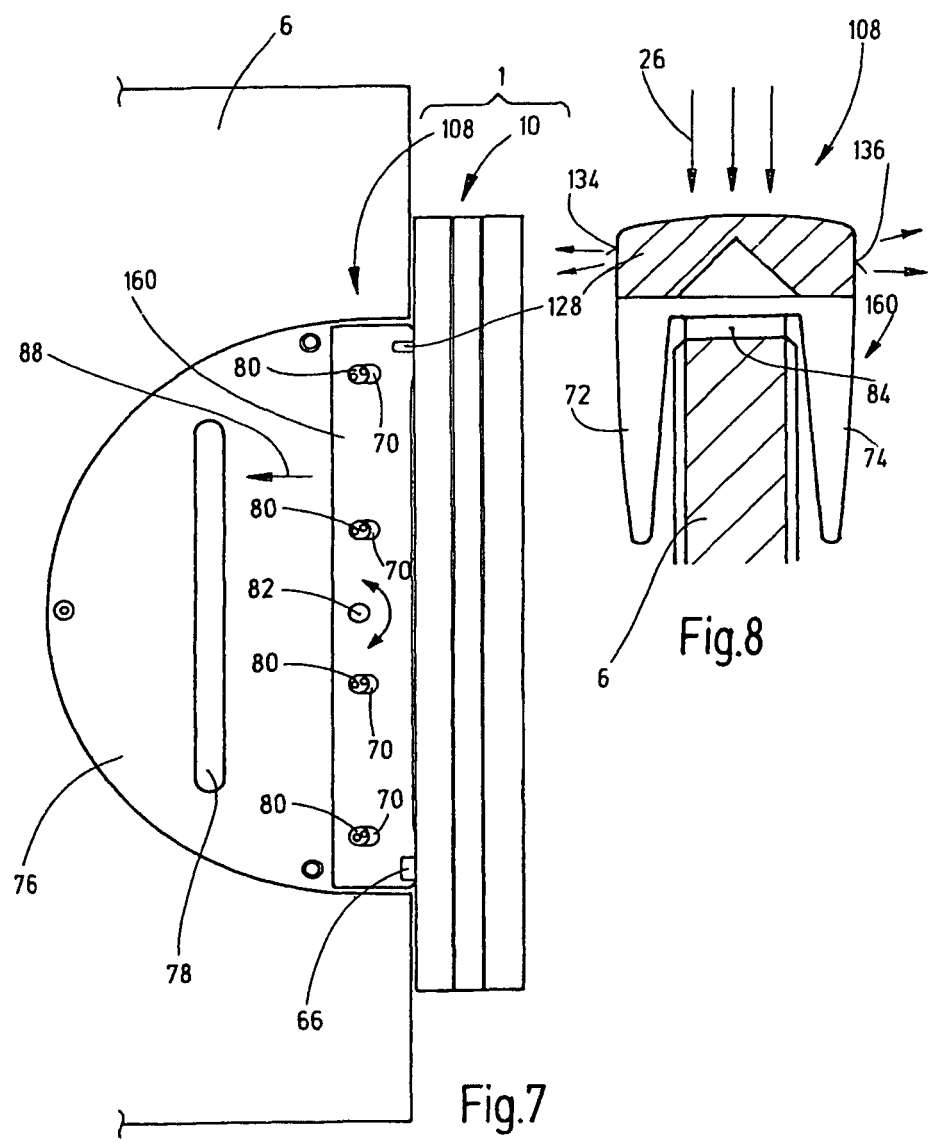

DEVICE FOR MONITORING THE STATE OF A SYSTEM

FIELD OF THE INVENTION

The invention relates to a device for monitoring the state of a mechanism, in particular a safety switch for monitoring the engaged state of a safety device of a machine.

BACKGROUND OF THE INVENTION

Safety switches are used for monitoring the state of a safety device of a machine, for example, for monitoring the engaged state of a safety door of a safety enclosure for a machine tool or an industrial robot. When the safety device is in the engaged state, the safety switch can provide an enable signal for the operation of the machine. When the safety device is disengaged, the safety switch interrupts one or more electric circuits, for example, by an electrical contact pair that are actuated by positive locking or by an electronic switching element. The enable signal is then no longer provided. The associated machine can then be transferred to a safe operational state, for example it may be turned off, or the turning on of the machine may be prevented.

In some applications, the engaged state of the safety device is necessary to be detachably fixed, for example when, in an operational state of the machine, while the disengagement of the safety device is to be prevented. The fixation is only removed, and the safety device can only be disengaged, when the machine is at a complete standstill.

In the case of safety switches having mechanical actuators, such a fixation or guard control is achieved by locking the mechanical actuator in a state in which it is inserted into the switch head, for example. Alternatively, a guard control using magnetic force is possible in the case of mechanical actuators, but in particular in the case of electronic actuators. A corresponding guard control system of a safety switch is known from DE 101 46 828 A1.

As a rule, the safety switches are connected to higher-level control systems, to which output signals are transmitted and can also be indicated there on a display. If an operator wishes to know the current state of the safety switch and the guard control for example, the operator does so using the control system.

EP 0 990 835 A 1 discloses a mechanical, electromechanical or otherwise driven device, having of at least two parts that can be moved toward one another and waveguides inside the parts. These waveguides are disposed such that in a specific position, the light waves pass through all partial waveguides and are detected. In the remaining positions, the passage of the light waves is inevitably interrupted.

DE 196 49 593 discloses a locking mechanism for controlling access to working equipment, wherein the locking mechanism has an optical sensor having a transmitter and a receiver. Only when the locking mechanism is in the engaged state, in which the operation of the working equipment is enabled, does the receiver receive coded optical signals that are emitted by the transmitter. The output signal of the transmitter is read into an evaluation device. The operation of the working equipment is blocked or enabled by the evaluation device.

FR 2 684 167 A discloses a device having two connectible profiles made of aluminum. Fiber optic elements are disposed in the two profile pieces such that, when the profiles are connected together, an optical contact bridge is formed.

DE 692 01 486 T2 discloses an electromagnetic closing device having an electromagnet disposed in an elongated, channel-shaped housing. The housing and the electromagnet have elongated projections and/or recesses, which interact with one another such that, with the exception of the longitudinal movement, any movement of the electromagnet is prevented.

SUMMARY OF THE INVENTION

An object of the present invention is to provide an improved generic device, the operating states of which can be safely determined with the least possible effort and on an ongoing basis.

The object is basically achieved by the device that can have a switch head and an actuator, which may be brought into interaction with one another to control the device. For example, the switch head may be disposed on a fixed part of the mechanism, for example on a frame of a protective screen, and the actuator may be disposed on a safety door movable with respect to the frame. When the door is closed, the switch head and the actuator are in interaction with one another, so that the device indicates the engaged state of the safety device to a higher-level control device.

According to the present invention, a part of the device, in particular the switch head, has an optical signaler for optically indicating an operational state of the device. For example, operational readiness and/or the engaged state of the safety device may be indicated. The other part of the device, in particular the actuator, has a light-conductor with at least one entrance window and at least one exit window for the light emitted by the optical signaler. In one state of the device, in which the switch head and the actuator are in interaction with one another, in particular in the engaged state of the safety device, the light emitted by the signaler enters into the light-guide by at least one of the entrance windows, and is guided by this light-guide to at least one of the exit windows, where the light exists. The signal from the optical signaler can then also be perceived in the engaged state of the safety device.

The optical signaler is preferably disposed on the switch head, which already has an electrical energy supply due to the other functions thereof. By contrast, the light-guide may preferably be disposed on the actuator, which, for example, is disposed on a movable part and need not have an electrical energy supply.

Advantageously, optical signaling by the device according to the invention is also possible, when the optical signaler is covered by the actuator in the state of the switch head and the actuator being in interaction with one another, in particular in contact with one another. In addition, the optional plurality of exit windows makes allows emitting the optical signal in different directions, for example simultaneously, both inside and outside of the safety device. At the same time, the optical signaler is disposed such that it is protected against contamination, damage and/or manipulation. In one embodiment, the entrance window and/or the exit window are flush with the surface surrounding them. Both contamination of and damage to the light-guide are thereby reliably prevented.

In one embodiment, the optical signaler is disposed on the switch head and at least one entrance window is disposed on the actuator such that, in the state of the device in which the switch head and the actuator are in interaction with one another, the optical signaler and the entrance window are disposed opposite one another. An advantageous coupling of the light emitted by the signaler is thereby ensured. At the same time, the optical signaler is covered by the actuator and is thereby protected against contamination and damage.

In one embodiment, the beam direction of the light exiting the exit window runs at an angle, in particular transversely as compared to the beam direction of the light generated by the light source of the optical signaler. The optical signal can thereby be emitted in different directions, in particular also in those directions, which cannot be covered by the optical signaler in the engaged state of the safety device for example. The beam direction is preferably deflected by the light-guide, for example by appropriate reflecting surfaces or partially permeable sections.

In one embodiment, the optical signaler has a light source and an additional light-guide. A light exit window may follow the additional light-guide or the additional light-guide itself may form the light exit window. A light emitting diode may be used as a source for the optical signaler, preferably a light emitting diode. The diode emits light signals of different colors depending on the control. Like the light-guide in the actuator, the additional light-guide may be made out of a plastic that is transparent to visible light, for example out of polymethylmethacrylate.

In one embodiment, the light-guide has a beam splitter, in particular in the form of a prism, which splits the light that enters by the entrance window to at least two exit windows. The optical signaler likewise then can have a beam splitter to allow the light emitted by the light source to exit to more than one light exit window. In particular when an efficient light source is used, the distribution of the emitted light beam into a plurality of partial beams is not detrimental to the visibility of the optical signal. If necessary, critical operating states may be signaled by a special light color and/or by increased light intensity and/or a pulsed light signal.

In one embodiment, the switch head is disposed, at least in part, in a groove of a profile, for example of an aluminum profile, as is used in industrialized building. The profile may be part of the device, but at the same time may also be part of the safety device by a corresponding mounting. In the state in which the switch head and the actuator are in interaction with one another, an light exit window of the optical signaler is covered by the actuator, which is likewise disposed, at least in part, in a groove of a profile. The arrangement in the groove of a profile ensures an especially space-saving construction. Moreover, not only the optical signaler, but also the switch head and, if applicable, the actuator, are disposed such that they are effectively protected against contamination and, in particular, against damage.

In one embodiment, the device has a guard locking device for detachably fixing a predefinable state of the mechanism, in particular the engaged state of the safety device. In any case, a state of the guard locking device can also be signaled by the optical signaler, for example the state "Guard control ready", "Guard control activated", "Amount of clamping force sufficient". The amount of clamping force can also be optically signaled, for example, by a special light color and/or with increased light intensity and/or a pulsed light signal.

In one embodiment, the guard locking device has a magnet, preferably disposed in the switch head, which, in the state of the device in which the switch head and the actuator are in interaction with one another, can be brought into an operative connection with a counter element or cross element of the actuator that conducts the magnetic flux.

The magnet may, in particular, comprise an electromagnet, which attracts the counter element of the actuator, and when energized, fixes the counter element in the attracted state. This state may be indicated by the optical signaler and emitted in different directions by the light-guide.

In one embodiment, the switch head has a read head, which, in the state of the device in which the switch head and the actuator are in interaction with one another, is in an electrically contactless interaction with the actuator. To this end, the actuator may have a transponder, which is encoded with a unique identifier. The state of a successful decoding, and therefore acceptance of the actuator by the safety switch, may also be indicated by the optical signaler.

The features mentioned in the description may be essential to the invention either individually, or in any combination.

Other objects, advantages and salient features of the present invention will become apparent from the following detailed description, which, taken in conjunction with the annexed drawings, discloses preferred embodiments of the present invention.

BRIEF DESCRIPTION OF THE DRAWINGS

Referring to the drawings that form a part of this disclosure:

FIG. 2 is a perspective view of a switch head disposed in a profile of the device of FIG. 1;

FIG. 3 is an enlarged side view in section of the optical signaler of FIG. 2;

FIG. 4 is an enlarged side view in section of the read head of FIG. 2;

FIG. 5 is a perspective view of an actuator of the device of FIG. 1;

FIG. 6 is an enlarged side view in section of the actuator of FIG. 5;

FIG. 7 is a side view of an actuator according to a second exemplary embodiment of the invention; and FIG. 8 is an end view through the actuator of FIG. 7 transverse to the longitudinal axis of the switch head.

DETAILED DESCRIPTION OF THE INVENTION

Figure 1:
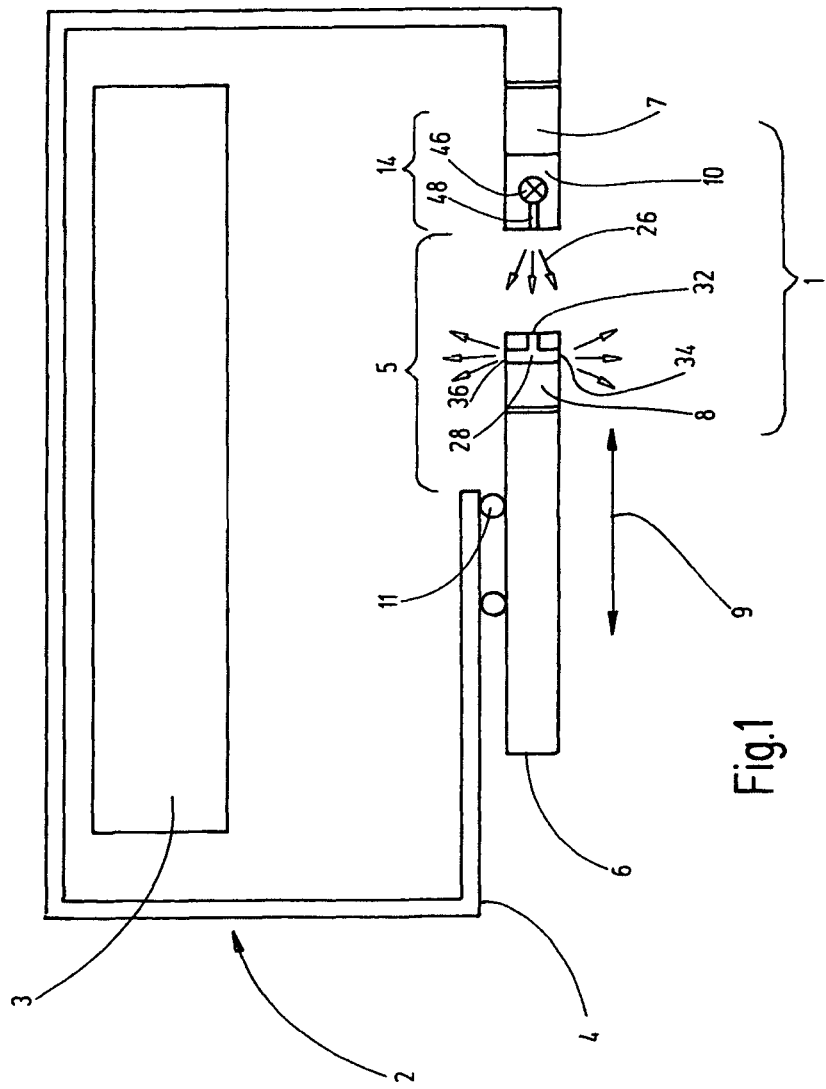
FIG. 1 is a schematic top view of an overall assembly of a device according to a first exemplary embodiment of the invention.

FIG. 1 is a top view schematically illustrating the overall assembly of a device 1 for monitoring the state of a safety device 2 for a machine 3, in particular of the engaged state of a safety door, with which a space separator can be locked, for example to protect the operator from being endangered by the machine 3 that is operating.

The safety device 2 has a first part 4, for example a frame. The first part 4 has an opening 5, which can be closed by a second part 6, for example by a safety door. The safety door can be moved relative to the first part 4 according to the double arrow 9 and may be movably mounted by mounting elements 11. Alternatively to being slid open and closed, the safety door may also be pivoted.

The device 1 preferably has a switch element 7 disposed on the fixed first part 4 of the safety device 2. The switch element comprises a switch head 10, as well as an actuator 8 preferably disposed on the movable second part 6. The actuator 8 can be brought into operative connection with the switch head 10 when the safety door is closed to control the switch element 7. The switch element 7 may either turn the machine 3 on or off itself, or may do so by separate switch elements or by a secondary or higher-level control device.

In the embodiment, the actuator 8 has a transponder 66 (FIG. 7) not shown in FIG. 1, which can interact with the switch head 10 in an electrically contactless manner. The switch head has a reader coil 30 (FIG. 4). An interaction is thereby only possible, when the safety device 2 is engaged. In a first operating mode, for example, a switch element is engaged by the interaction between the actuator 8 and the switch head 10 when the safety device 2 is engaged. An enable signal is thereby provided for the operation of the machine 3. When the safety device 2 is disengaged, the interaction is interrupted, the switch element is disengaged, and the machine 3 is shut off.

The device 1 may also have a guard control, by which the engaged state of the safety device 2 can be releasably locked. The guard control may be implemented mechanically, for example preferably by a positive locking fixing of the actuator 8 to the switch head 7, or by a magnetic force.

The switch head 10 has an optical signaler 14, which has a light source 46 and a light-conductor 48. Light-conductor 48 guides the light from the light source 46 to the surface of the switch head 10. In the engaged state of the safety device 2, the light 26 emitted by the signaler 14 can enter into the actuator 8 via the entrance window 32, and after being deflected 90° by a light-guide 28, can exit at the two exit windows 34, 36. Thus, the signal from the signaler 14 can thereby be perceived even in the engaged state of the safety device 2, both inside and outside of the safety device 2, regardless of the fact that the signaler 14 is covered by the actuator 8.

FIG. 2 shows a perspective view of an embodiment of a switch head 10 disposed in a profile 12. FIGS. 3 and 4 show an enlarged illustration of details of the switch head 10. The optical signaler 14 is disposed in a groove 16 of the profile 12. Also disposed in the groove 16 is an electromagnet of a locking device having a pole shoe 18 for releasably fixing a predefinable state of the safety device 2. In addition, the read head 20 is disposed in the groove 16. The optical signaler 14, the electromagnet and the read head 20 are preferably implemented in a single assembly and are electrically connected by a shared connection line 24 that extends along the groove 16. In particular, individual components may each be cast individually connected to one another by the casting compound 30 or may even be cast in the profile 12.

The signaler 14 comprises the light source 46, which is disposed on a printed circuit board 44. The light source may also be a multi-colored LED if necessary. The light emitted by the light source 46 is guided by the light-guide 48 to a light exit window 22, which exit window is flush with the surrounding surface of the switch head 10.

The read head 20 has a solenoid 40 disposed on a printed circuit board 38, which circuit board is covered by a cover 42. The cover 42 is flush with the profile 12. The solenoid 40 may exchange signals with a counterpart disposed on the actuator 8 in an electrically contactless manner, for example by a transponder 66.

FIG. 5 shows a perspective view of an actuator 8, which can be brought into interaction with the switch head 10 in FIG. 2 and which thereby controls the device 1. The actuator 8 is likewise disposed, at least in sections, in a groove 62 of an additional profile 52. The actuator 8 has a cross element 54. By cross element 54, the magnetic flux emitted by one pole shoe 18 enters an adjacent pole shoe 18 and can be conducted. The cross element 54 is attracted when the electromagnet of the switch head 10 is energized and held in contact with the pole shoes 18. The safety device 2 is then locked shut. The cross element 54 is fixed to the additional profile 52 by a fastening element 60. The position along the groove 62 can be fixed by the fixing element 64.

FIG. 6 shows an enlarged illustration of a cross section through the actuator 8 in the region of the light-guide 28. The contour of the light-guide 28 is adapted to the contour of the surrounding fastening element 60 in the region of the light 26 emitted by the signaler 14. In the embodiment, this contour is curved with the exception of a central planar section, the extension of which is adapted to the size of the light exit window 22. The incident light is split by reflection at a beam splitter 56 into two partial beams that extend perpendicular to the incident light. The partial beams each exit the light-guide 28 at an exit window 34, 36. The contour of the light-guide 28 is adapted to the surrounding fastening element 60 in the region of the exit windows 34, 36 and is curved in the embodiment.

FIG. 7 is a side view of a second embodiment of an actuator 108 in the engaged state of the safety device 2, thus in contact with the switch head 10 from FIG. 2 disposed in the profile 12. The assembly in FIG. 7, including the switch head 10 and the actuator 108, form a safety switch. By the safety switch, the locked state of the safety device 2 may not only be fixed, but this state can also be signaled to a higher-level machine control.

The actuator 108 is, in particular, provided to attach a preferably plate-shaped second part 6 of the safety device 2 to the front side, for example, to the front side of a glass door. The second part 6 can be moved by a handle 78 disposed on a handle plate 76. The second part 6 may be a swinging door, a lift gate or a revolving door, for example.

FIG. 8 is a sectional view through the actuator 108 in FIG. 7, transverse to the longitudinal axis of the switch head 10, in the region of the light-guide 128. Corresponding to the light exit window 22, the contour of the light-guide 128 in the region of the light 26 emitted by the signaler 14 is initially centrally planar and then curved. The incident light is split by reflection at a beam splitter into two partial beams that extend perpendicular to the incident light, which partial beams each exit the light-guide 128 at an exit window 134, 136. The contour of the light-guide 128 is adapted to the surrounding fastening element 160 in the region of the exit windows 134, 136 and is essentially planar in the embodiment.

The actuator 108, in particular the associated fastening element 160, has an essentially U-shaped cross section with two brackets 72, 74, between which the second part 6 of the safety device is accommodated. The two brackets 72, 74 have a plurality of elongated holes 70, preferably disposed equidistantly on the brackets 72, 74, which holes are paired with one another. Essentially cylindrical fasteners 80 are inserted into the elongated holes 70, by which fasteners the actuator 108 may be firmly but movably attached to the second part 6.

The actuator 108 can be pivoted, relative to the second part 6, about a first axis 82, which extends at a right angle to the longitudinal axis of the actuator 108. In the embodiment, that axis extends perpendicular to the drawing plane of FIG. 7, and/or can be pivoted about a second axis 84, which second axis 84 extends parallel to the longitudinal axis of the actuator 108. In the embodiment, the second axis 84 extends perpendicular to the drawing plane of FIG. 8. To this end, both brackets 72, 74 have surfaces on their inner sides, the spacing between which surfaces increases in the direction of the free end of the brackets 72, 74. The inner surfaces of the brackets 72, 74 thereby also form a stop for the pivoting movement around the second axis 84. In addition, the actuator 108 can be displaced along a direction 88 that extends perpendicular to the longitudinal axis of the actuator 108. The actuator 108 can thereby be deflected when the second part 6 is closed after contact with the switch head 10 and in particular, may be held, spring-loaded, in contact with the switch head 10, in particular on the pole shoes 18. To this end, the actuator 108 may have a spring element, which, in particular, may be disposed between the fastening element 160 and the front end of the second part 6, and may be formed by the fastening element 160 as a single piece.

While various embodiments have been chosen to illustrate the invention, it will be understood by those skilled in the art that various changes and modifications can be made therein without departing from the scope of the invention as defined in the claims.

The invention claimed is:

1. A device for monitoring states of a mechanism, comprising:
   a switch head;
   an actuator movable into and out of interaction with said switch head to control the device, said actuator having a light conductor with at least one entrance window and a first exit window, said actuator being disposed in a groove of an actuator profile;
   an optical signaler coupled to said switch head issuing light signals indicating an operational state of the device, said light signals entering said entrance window and exiting said first exit window when said switch head and said actuator are interacting with one another, said optical signaler having a light exit window, said light exit window of said optical signaler being covered by said actuator when said switch head and said actuator are interacting with one another; and
   a switch head profile having a groove, said switch head being disposed on said switch head profile in said groove of said switch head profile.

2. A device according to claim 1 wherein
   said optical signaler is disposed on said switch head; and
   said entrance window is disposed on said actuator such that said optical signaler and said entrance window are opposite one another when said switch head and said actuator are interacting with one another.

3. A device according to claim 1 wherein
   a conductor beam direction of light exiting said first exit window of said light conductor extends angularly relative to a source beam direction of light generated by a light source of said optical signaler.

4. A device according to claim 3 wherein
   said conductor beam direction is transverse to said source beam direction.

5. A device according to claim 3 wherein
   light in said source beam direction is deflected by a light guide of said light conductor.

6. A device according to claim 3 wherein
   said optical signaler comprises a light source and a signal light guide forming a light exit window of said optical signaler.

7. A device according to claim 3 wherein
   said optical signaler comprises a light source and a signal light guide connected to a light exit window.

8. A device according to claim 3 wherein
   said light conductor comprises a beam splitter splitting light entering via said entrance window to said first exit window and to a second exit window of said actuator.

9. A device according to claim 8 wherein
   said beam splitter is a prism.

10. A device according to claim 3 wherein
    a guard locking device detachably fixes a predetermined state of a safety device of a machine, said optical signaler signally a state of said guard locking device.

11. A device according to claim 10 wherein
    said guard locking device comprises a magnet in said switch head operatively connected with a counter element of said actuator conducting magnetic flux when said switch head and said actuator interact with one another.

12. A device for monitoring states of a mechanism, comprising:
    a switch head;
    an actuator movable into and out of interaction with said switch head to control the device, said actuator having a light conductor with at least one entrance window and a first exit window, said switch head including a read head in an electrically contactless interaction with said actuator when said switch head and said actuator interact with one another;
    an optical signaler coupled to said switch head issuing light signals indicating an operational state of the device, said light signals entering said entrance window and exiting said first exit window when said switch head and said actuator are interacting with one another, said optical signaler having a light exit window, said light exit window of said optical signaler being covered by said actuator when said switch head and said actuator are interacting with one another;
    a switch head profile having said switch head disposed thereon; and
    a conductor beam direction of light exiting said first exit window of said light conductor extending angularly relative to a source beam direction of light generated by a light source of said optical signaler.

13. A device for monitoring states of a mechanism, comprising:
    a switch head;
    an actuator movable into and out of interaction with said switch head to control the device, said actuator having a light conductor with at least one entrance window and a first exit window;
    an optical signaler coupled to said switch head issuing light signals indicating an operational state of the device, said light signals entering said entrance window and exiting said first exit window when said switch head and said actuator are interacting with one another; and
    a guard locking device detachably fixing a predetermined state of a safety device of a machine, said optical signaler signaling a state of said guard locking device, said guard locking device including a magnet in said switch head operatively connected with a counter element of said actuator conducting magnetic flux when said switch head and said actuator interact with one another.

14. A device according to claim 13 wherein
    said switch head comprises a read head in an electrically contactless interaction with said actuator when said switch head and said actuator interact with one another.

15. A device for monitoring states of a mechanism, comprising:
    a switch head;
    an actuator movable into and out of interaction with said switch head to control the device, said actuator having a light conductor with at least one entrance window and a first exit window;
    an optical signaler coupled to said switch head issuing light signals indicating an operational state of the device, said light signals entering said entrance window and exiting said first exit window when said switch head and said actuator are interacting with one another; and
    a read head of said switch head in an electrically contactless interaction with said actuator when said switch head and said actuator interact with one another.

* * * * *